United States Patent
Yang et al.

(10) Patent No.: US 11,532,180 B2
(45) Date of Patent: Dec. 20, 2022

(54) IMAGE PROCESSING METHOD AND DEVICE AND STORAGE MEDIUM

(71) Applicant: SHANGHAI SENSETIME INTELLIGENT TECHNOLOGY CO., LTD., Shanghai (CN)

(72) Inventors: Kai Yang, Shanghai (CN); Zihao Xu, Shanghai (CN); Jingjing Fei, Shanghai (CN); Liwei Wu, Shanghai (CN)

(73) Assignee: SHANGHAI SENSETIME INTELLIGENT TECHNOLOGY CO., LTD., Shanghai (CN)

( * ) Notice: Subject to any disclaimer, the term of this patent is extended or adjusted under 35 U.S.C. 154(b) by 99 days.

(21) Appl. No.: 17/137,819

(22) Filed: Dec. 30, 2020

(65) Prior Publication Data
US 2021/0117674 A1    Apr. 22, 2021

Related U.S. Application Data (63) Continuation of application No. PCT/CN2019/121695, filed on Nov. 28, 2019.

(30) Foreign Application Priority Data

Sep. 26, 2019  (CN) .......................... 201910919121.9

(51) Int. Cl.
*G06K 9/00* (2022.01)
*G06K 9/62* (2022.01)
(Continued)

(52) U.S. Cl.
CPC ......... *G06V 40/197* (2022.01); *G06K 9/6288* (2013.01); *G06V 10/751* (2022.01); *G06V 40/193* (2022.01)

(58) Field of Classification Search
CPC ........ G06K 9/6257; G06N 20/20; G06N 3/04; G06F 17/16
See application file for complete search history.

(56) References Cited

U.S. PATENT DOCUMENTS

| | | | |
|---|---|---|---|
| 2009/0169064 A1 | 7/2009 | Kim et al. | |
| 2011/0317883 A1* | 12/2011 | Kondo ................... | G06V 40/18 382/117 |
| 2018/0218213 A1 | 8/2018 | Lee et al. | |

FOREIGN PATENT DOCUMENTS

| CN | 101539990 A | 9/2009 |
|---|---|---|
| CN | 104063872 A | 9/2014 |

(Continued)

OTHER PUBLICATIONS

Gu et al, 'Facial expression recognition using radial encoding of local Gabor features and classifier synthesis', 2012, Pattern Recognition 45, pp. 80-91 (12 pages) (Year: 2012).*

(Continued)

*Primary Examiner* — David F Dunphy
(74) *Attorney, Agent, or Firm* — BakerHostetler (57) ABSTRACT

The present disclosure relates to an image processing method and device, an electronic apparatus and a storage medium. The method comprises: acquiring an iris image group comprising at least two iris images to be compared; detecting iris locations in the iris images and segmentation results of iris areas in the iris images; performing multi-scale feature extraction and multi-scale feature fusion on an image area corresponding to the iris locations, to obtain iris feature maps corresponding to the iris images; performing comparison using the segmentation results and the iris feature maps respectively corresponding to the at least two iris images, and determining whether the at least two iris images correspond to the same object based on a comparison result of the (Continued)

comparison. Embodiments of the present disclosure realize accurate comparison of iris images.

19 Claims, 6 Drawing Sheets

(51) Int. Cl.
  *G06V 40/18*  (2022.01)
  *G06V 10/75*  (2022.01)

(56) References Cited

FOREIGN PATENT DOCUMENTS

| CN | 106326841 A | 1/2017 |
| CN | 106778664 A | 5/2017 |
| CN | 107506754 A | 12/2017 |
| CN | 108229531 A | 6/2018 |
| CN | 109426770 A | 3/2019 |
| CN | 110059589 A | 7/2019 |
| JP | 2002-259981 A | 9/2002 |
| JP | 2004-206444 A | 7/2004 |
| JP | 2008-521122 A | 6/2008 |
| RU | 2670798 C1 | 10/2018 |
| TW | 555547 B | 10/2003 |
| WO | WO 2012/142756 A1 | 10/2012 |

OTHER PUBLICATIONS

Si et al.; "Novel Approaches to Improve Robustness, Accuracy and Rapidity of Iris Recognition Systems"; IEEE Transactions on Industrial Informatics; vol. 8; Feb. 2012; p. 110-117.

Zhao Yanming; "The Iris Recognition Algorithm Based on Scale Correlation Multi-Feature Extraction and Fusion";Computer Applications and Software; vol. 30; Jul. 2013; p. 189-192 (English Abstract).

Chen et al.; "Deep Feature Fusion by Competitive Attention for Pedestrian Detection"; IEEE Special Section on AI-Driven Big Data Processing: Theory, Methodology, and Applications; vol. 7; 2019; p. 21981-21989.

John Daugman; "The importance of being random: statistical principles of iris recognition"; Pattern Recognition; vol. 36; 2003; p. 279-291.

* cited by examiner

IMAGE PROCESSING METHOD AND DEVICE AND STORAGE MEDIUM

CROSS-REFERENCE TO RELATED APPLICATION

The present application is a continuation of and claims priority under 35 U.S.C. § 120 to PCT Application. No. PCT/CN2019/121695, filed on Nov. 28, 2019, which claims the priority to Chinese Patent Application No. 201910919121.9 filed with National Intellectual Property Administration, PRC, on Sep. 26, 2019, entitled "Image Processing Method and Device, Electronic Apparatus and Storage Medium". All the above referenced priority documents are incorporated herein by reference in their entireties.

TECHNICAL FIELD

The present disclosure relates to the technical field of computer vision, in particular to an image processing method and device, an electronic apparatus and a storage medium.

BACKGROUND

Iris recognition technology uses the characteristics of lifelong stability and uniqueness of iris for identity authentication. The superiority of iris recognition makes it highly promising in the application in various aspects including finance, e-commerce, security, immigration control, and so on.

Currently, iris recognition algorithms generally use filters to extract features of the iris.

SUMMARY

The present disclosure proposes a technical solution of image processing.

According to an aspect of the present disclosure, provided is an image processing method, comprising: acquiring an iris image group comprising at least two iris images to be compared; detecting iris locations in the iris images and segmentation results of an iris area in the iris images; performing multi-scale feature extraction and multi-scale feature fusion on an image area corresponding to the iris location, to obtain an iris feature map corresponding to the iris images; performing comparison using the segmentation result and the iris feature map respectively corresponding to the at least two iris images in the iris images group, and determining whether the at least two iris images correspond to the same object based on a comparison result of the comparison. Based on the above configuration, it is possible to extract feature information of multiple scales by multi-scale feature extraction, for example, obtaining feature information of low level and high level simultaneously, and then obtain feature maps with higher accuracy by multi-scale feature fusion, thereby realizing more accurate comparison and improving the accuracy of the comparison result.

According to a second aspect of the present disclosure, provided is an image processing device, comprising: an acquisition module configured to acquire an iris image group comprising at least two iris images to be compared; a detection module configured to detect an iris location in the iris images and a segmentation result of iris area in the iris images; a feature processing module configured to perform multi-scale feature extraction and multi-scale feature fusion on the image area corresponding to the iris location, to obtain an iris feature map corresponding to the iris images; and a comparison module configured to perform comparison using the segmentation result and the iris feature map respectively corresponding to the at least two iris images, and determine whether the at least two iris images correspond to the same object based on a comparison result of the comparison.

According to a third aspect of the present application, provided is an electronic apparatus, comprising:
 a processor;
 a memory configured to store processor executable instructions;
 wherein, the processor is configured to call instruction stored in the memory to execute the method according to any of the first aspect.

According to a fourth aspect of the present disclosure, provided is a computer readable storage medium stored computer program instructions thereon, wherein the computer program instructions implements the method according to any of the first aspect when executed by a processor.

According to a fifth aspect of the present disclosure, provided is a computer program, comprising computer readable codes, wherein when the computer readable codes run in an electronic apparatus, a processor in the electronic apparatus executes the image processing method.

In the embodiments of the present disclosure, by performing preprocessing on the iris images, the iris area in the iris images is located and segmented to obtain the iris location and the segmentation result of the iris. Meanwhile, multi-scale feature extraction and multi-scale feature extraction can be performed on the iris images to obtain high-precision iris feature maps. Then, the segmentation results and the iris feature maps are used to perform the identity recognition on the iris images to determine whether the iris images correspond to the same object. Through the above configuration, it is possible to sufficiently fuse the extracted low-level features and high-level features by means of multi-scale feature extraction and multi-scale feature fusion, so that the finally obtained iris features take into account both the texture features at a low level and the classification features at a high level, thereby improving the accuracy of feature extraction. In addition, it is also possible to only consider the feature part of the iris area and reduce the influence of the other areas by using the combination of the segmentation results and iris feature maps, thereby more accurately identifying whether the iris images correspond to the same object and obtaining more accurate detection result.

It is appreciated that the foregoing generic description and the following detailed description are exemplary and illustrative and does not limit the present disclosure.

According to the following detailed description of exemplary embodiments with reference to the attached drawings, other features and aspects of the present disclosure will be made clear.

BRIEF DESCRIPTION OF THE DRAWINGS

The drawings here, which are incorporated in and constitute part of the specification, illustrate exemplary embodiments of the present disclosure, and serve to explain the technical solutions of the present disclosure together with the description.

DETAILED DESCRIPTION

Various exemplary embodiments, features and aspects of the present disclosure will be described in detail with reference to the drawings. The same reference numerals in the drawings represent parts having the same or similar functions. Although various aspects of the embodiments are shown in the drawings, it is unnecessary to proportionally draw the drawings unless otherwise specified.

Herein the term "exemplary" means "used as an instance or embodiment, or explanatory". Any "exemplary" embodiment given here is not necessarily construed as being superior to or better than other embodiments.

Herein the term "and/or" describes an association relation between associated objects and indicates three possible relations. For example, the phrase "A and/or B" may indicate a case where only A is present, a case where A and B are both present, and a case where only B is present. In addition, the term "at least one" herein indicates any one of a plurality or an arbitrary combination of at least two of a plurality. For example, including at least one of A, B and C means including any one or more elements selected from a set consisting of A, B and C.

In addition, numerous details are given in the following embodiments for the purpose of better explaining the present disclosure. It should be understood by a person skilled in the art that the present disclosure can still be realized even without some of those details. In some of the examples, methods, means, elements and circuits that are well known to a person skilled in the art are not described in detail so that the spirits of the present disclosure become apparent.

The embodiments of the present disclosure provide an image processing method applicable to distinguish whether the objects corresponding to iris images are the same object, such as whether they are the iris images of the same human object, by iris features corresponding to the iris images. The execution subject of the image processing method may be an image processing device. For example, the image processing method may be executed by a terminal apparatus or a server or other processing apparatus, wherein the terminal apparatus may be a user equipment (UE), a mobile apparatus, a user terminal, a terminal, a cellular phone, a cordless phone, a personal digital assistant (PDA), a handheld apparatus, a computing apparatus, an in-vehicle apparatus, a wearable apparatus, etc., the server may be a local server or a cloud server. In some possible implementations, the image processing method may be implemented by a processor calling computer readable instruction stored in a memory.

Figure 1:
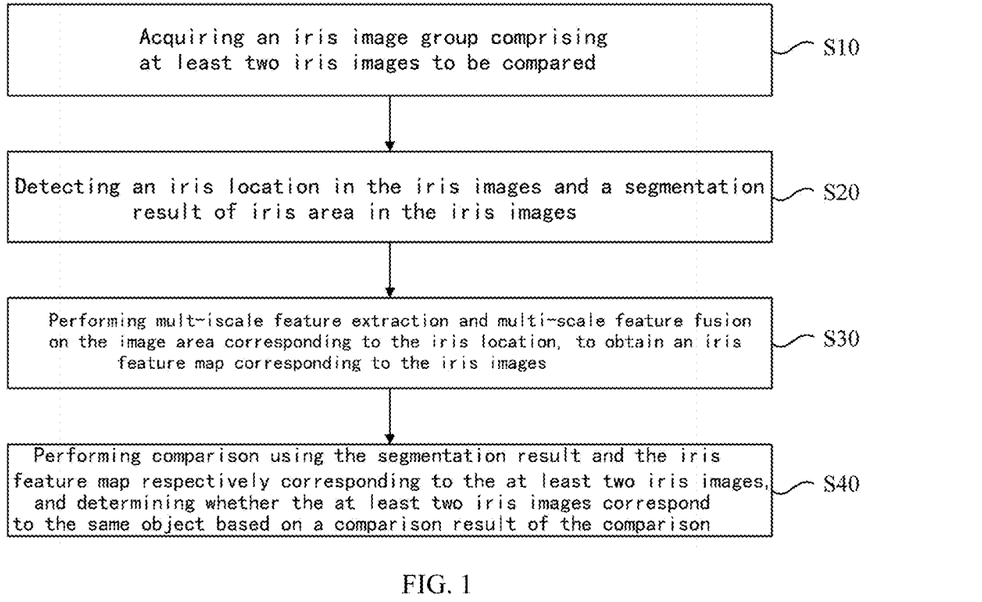
FIG. 1 shows a flow chart of an image processing method according to an embodiment of the present disclosure.

FIG. 1 shows a flow chart of an image processing method according to an embodiment of the present disclosure. As shown in FIG. 1, the image processing method comprises:

S10: acquiring an iris image group comprising at least two iris images to be compared.

In some possible embodiments, in the field of computer vision, identity verification may be performed using an iris image to identify the identity of the object corresponding to the iris images, or to determine whether the corresponding object has the permission. The embodiments of the present disclosure is capable of confirming whether the objects corresponding to the iris images are the same object by performing feature processing on the iris images and performing comparison of the iris images based on the obtained features. In other embodiments, it is also possible to further performing corresponding verification operation based on whether the determined iris images correspond to the same object.

The embodiment of the present disclosure may first obtain the iris images to be compared. The iris images to be compared form an iris image group. At least two iris images may be obtained. For example, the iris images to be compared in the embodiments of the present disclosure may be captured by an iris camera, received through transmission by other devices, or read from a memory. These are only exemplary description; the present disclosure is not limit hereto.

S20: detecting an iris location in the iris images and a segmentation result of iris area in the iris images.

In some possible embodiments, the iris images may be first subjected to preprocessing, where the preprocessing may include locating the iris and pupil in the iris images to determine the position of the iris and pupil. Here, iris location and pupil location may be respectively indicated by a position corresponding to the detection frame of the iris and the detection frame of the pupil. Based on the detected position of the iris and pupil in the iris images, segmentation process may be further performed on the iris area to obtain the corresponding segmentation result, wherein the segmentation result may be expressed as a mask map.

The mask map may take the form of vector or matrix. The mask map may correspond to the pixels of the iris images one to one. The mask map may include a first identification and a second identification, wherein the first identification indicates that the corresponding pixel is the iris area, and the second identification indicates that the corresponding pixel is a non-iris area. For example, the first identification may be "1", and the second identification may be "0". Thence, the area where the iris is located can be determined by an area consisting of the pixels of the first identification in the mask map.

S30: performing multi-scale feature extraction and multi-scale feature fusion on the image area corresponding to the iris location, to obtain an iris feature map corresponding to the iris images.

In some possible embodiments, in a case that the iris location in the iris images is determined, the image area corresponding to the iris location may be subjected to multi-scale feature extraction, for example, obtaining feature maps of at least two scales. Then, by performing convolution on the feature maps, it is possible to realize fusion of features, thereby obtaining the iris feature map of the iris images.

In some possible embodiments, during the process of feature extraction, a plurality of feature maps of different scales of the image area corresponding to the iris location can be obtained. For example, the feature extraction may be performed through a residual network; and then the feature maps of multiple scales may be convolved at least once to obtain an iris feature map that fuses features of different scales. Through multi-scale feature extraction, feature information of both low levels and high levels can be obtained at the same time. Through multi-scale feature fusion, the low-level and high-level feature information can be effectively fused to improve the accuracy of the iris feature map.

In some possible embodiments, different attention coefficients may be obtained for different features by an attention mechanism. The attention coefficient may indicate the degree of importance of a feature. Feature fusion performed using the attention coefficient can obtain stronger and more distinguishable features.

S40: performing comparison using the segmentation result and the iris feature map respectively corresponding to the at least two iris images, and determining whether the at least two iris images correspond to the same object based on a comparison result of the comparison.

In some possible embodiments, a position that is the iris area in both iris images may be obtained according to the segmentation results (e.g., the mask map) of the at least two iris images to be compared. Based on the distance between the features corresponding to the positions of the iris regions, the comparison result of the at least two iris images can be obtained. Where the distance is less than a first threshold, it means that the two iris images compared with each other correspond to the same object, i.e. are iris images belonging to the same object. Otherwise, if the distance is greater than or equal to the first threshold, it means that the two iris images do not belong to the same object. It should be noted that when the iris images group includes three or more iris images to be compared, any two of the iris images may be compared respectively to determine whether the any two iris images correspond to the same object. Also, iris images in the iris images group which belong to the same object are determined according to the comparison results of each iris image. Meanwhile, the number of objects corresponding to the iris images in the iris images group may be counted.

Figure 2:
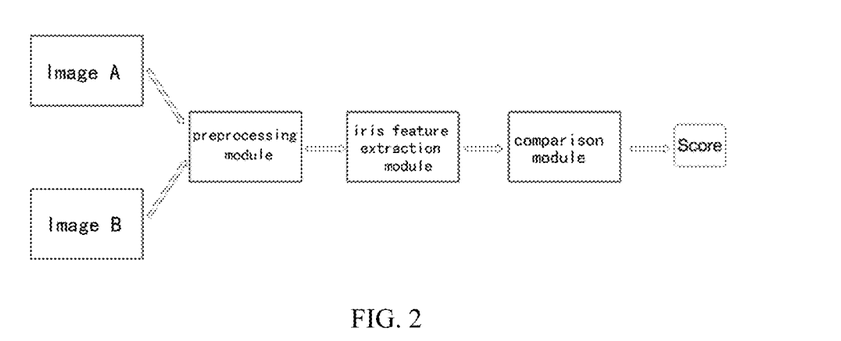
FIG. 2 shows a schematic process chart of an image processing method according to an embodiment of the present disclosure.

The following description is made with the case of two iris images as an example. The theory for performing the comparison of multiple images is the same with the following and will not be explained repetitively. FIG. 2 shows a schematic flow chart of an image processing method according to an embodiment of the present disclosure. Firstly, two iris images A and B may be obtained. The two iris images are subjected to preprocessing to obtain the iris location and pupil location in the iris images and the segmentation result such as a mask map corresponding to the iris area. Then, the iris feature extraction module may be used to execute feature extraction and fusion on the image area corresponding to the iris location to obtain the iris feature map of the iris images. Further, the comparison module may be used to obtain a comparison result (score) that whether image A and image B are of the same object based on the mask map and the corresponding iris feature map.

Based on the above configuration, the embodiments of the present disclosure may locate and segment the iris areas in the iris images by performing target detection on the iris images, to obtain the segmentation results corresponding to the iris areas. Meanwhile, multi-scale feature extraction and multi-scale feature extraction can be performed on the iris images to obtain high-precision iris feature maps. Then, the segmentation results and the iris feature maps are used to perform the identity recognition on the iris images to determine whether the iris images correspond to the same object. Through the above configuration, it is possible to sufficiently fuse the extracted low-level features and high-level features by means of feature fusion, so that the finally obtained iris features take into account both the texture features at a low level and the classification features at a high level, thereby improving the accuracy of feature extraction. Meanwhile, it is also possible to only consider the feature part of the iris area and reduce the influence of the other areas by combining the segmentation results and iris feature maps, thereby more accurately identifying whether the iris images correspond to the same object and obtaining more accurate detection result.

Figure 3:
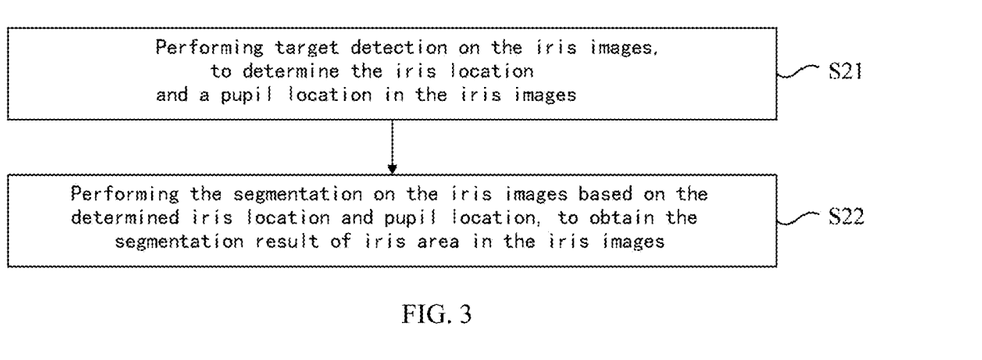
FIG. 3 shows a flow chart of step S20 in an image processing method according to an embodiment of the present disclosure.

Embodiments of the present disclosure are described in details below with reference to the attached drawings. According to the embodiments of the present disclosure, in a case where the iris images to be compared are obtained, it is possible to subject the iris images to target detection to obtain the positions corresponding to the iris area and the pupil area, thereby obtaining the segmentation mask map corresponding to the iris area. FIG. 3 shows a flow chart of step S20 in an image processing method according to an embodiment of the present disclosure. The detecting an iris location in the iris images and a segmentation result of iris area in the iris images comprises:

S21: performing target detection on the iris images, to determine the iris location and the pupil location in the iris images; and S22: performing the segmentation on the iris images based on the determined iris location and pupil location, to obtain the segmentation result of iris area in the iris images.

Figure 4:
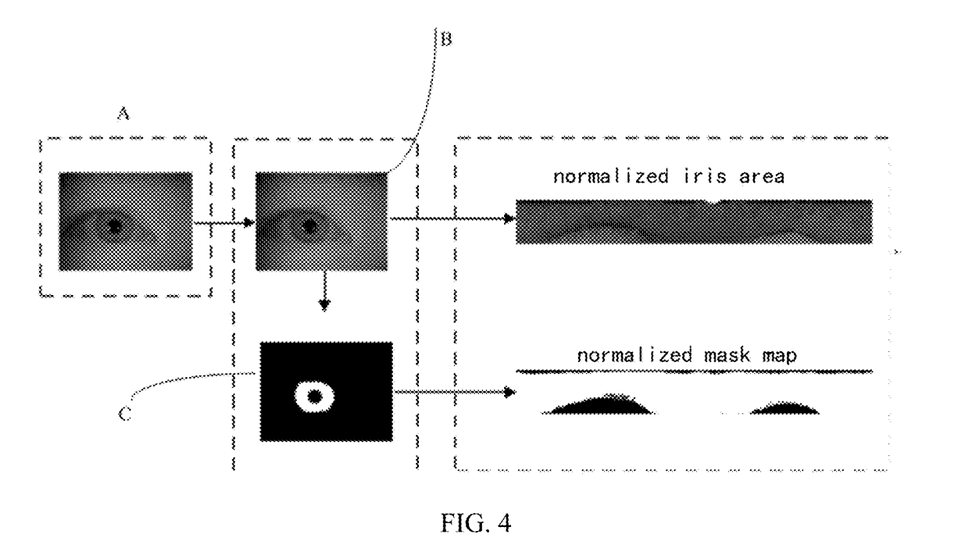
FIG. 4 shows a schematic diagram of preprocessing of iris images in an image processing method according to an embodiment of the present disclosure.

In some possible embodiments, in a case where the iris images are obtained, the iris images may be subjected to preprocessing to obtain iris features of the above iris images and the segmentation results of the iris areas. Firstly, target detection of the iris images may be performed by a neural network capable of performing target detection, wherein the neural network may be a convolution neural network and is capable of identifying the iris location and the pupil location in the iris images after training. FIG. 4 shows a schematic diagram of preprocessing of iris images in an image processing method according to an embodiment of the present disclosure. A indicates the iris image. After the target detection, the iris location and the pupil location in the iris images can be determined. B indicates the image area corresponding to the iris location in the iris images. The area corresponding to the pupil location is not shown. During actual application and detection, the area corresponding to the pupil location may be detected at the same time. As described in the foregoing embodiment, the iris location and pupil location obtained by performing target detection may be respectively indicated by a position corresponding to the detection frame of the iris and the detection frame of the pupil, which may be expressed as (x1, x2, y1, y2), wherein (x1, y1) and (x2, y2) are coordinates of the positions of two diagonal vertexes of the detection frame of the iris or the pupil, respectively.

Based on the coordinates of the two vertexes, it is possible to determine the position of the area of the corresponding detection frame. In other embodiments, the position of the detection frame may be expressed in other forms, which is not specifically limited herein.

In addition, the neural network for executing target detection in the embodiments of the present disclosure may include: a Faster R-CNN neural network (faster target identification convolutional neural network) or a Retina network (single-stage target detection network), which is not limited hereto.

In a case where the iris location and the pupil location in the iris images are obtained, segmentation of iris area of the iris images may be further performed, so as to segment and distinguish the iris area from the other part such as the lid and the pupil.

In one example, the iris location and the pupil location may be used to directly segment the iris area in the iris images. That is, the image area corresponding to the pupil location may be deleted from the image area corresponding to the iris location, and the remaining image area in the image area of the iris location is determined as the segmentation result of the iris area. The iris area is assigned a mask value of the first identification, and the remaining area is assigned a mask value of the second identification, thereby obtaining the mask map corresponding to the iris area. This method has the characteristics of simplicity and convenience, and is capable of increasing the processing speed.

In another example, the iris location, the pupil location and the corresponding iris image may be input to the neural network for iris segmentation. The mask map corresponding to the iris area in the iris images is output through the neural network. The neural network for iris segmentation may be capable of determining the iris area in the iris images through training, and generates the corresponding mask map. The neural network may also be a convolution neural network, for example, a PSPNet (Pyramid Scene Analysis Network) or a Unet (U-shaped network), which is not limited hereto. C of FIG. 4 is a schematic diagram of the iris area corresponding to the iris images, where the black part represents the image area other than the iris area and has the mask value of the second identification. The white part is the iris area and has the mask value of the first identification. In this way, the iris area is accurately detected, thereby improving the accuracy of subsequent comparison.

In some possible embodiments, since the size of the obtained iris image and the size of the mask map of the detected iris area may be different, an embodiment of the present disclosure may further perform normalization on the image area corresponding to the iris location and the mask map when the iris location in the iris images and the mask map (segmentation result) of the iris area are obtained, so that the normalized image area and mask map are adjusted to the preset specifications. For example, an embodiment of the present disclosure may adjust the image area of the iris location and the mask map to have a height of 64 pixels and a width of 512 pixels. The specific dimension is not limited in the present disclosure.

When the position of the iris in the iris images and the corresponding segmentation result are obtained, feature processing of the corresponding image may be performed based on the obtained iris location to obtain the iris feature. In addition, an embodiment of the present disclosure may also perform multi-scale feature processing on the normalized image area corresponding to the iris location to further improve the feature accuracy. The following is an example of directly performing multi-scale feature extraction and multi-scale fusion on the image area corresponding to the iris location. The multi-scale feature processing and multi-scale fusion of the normalized image area corresponding to the iris location will not be repeated herein, the processing process being the same.

Figure 5:
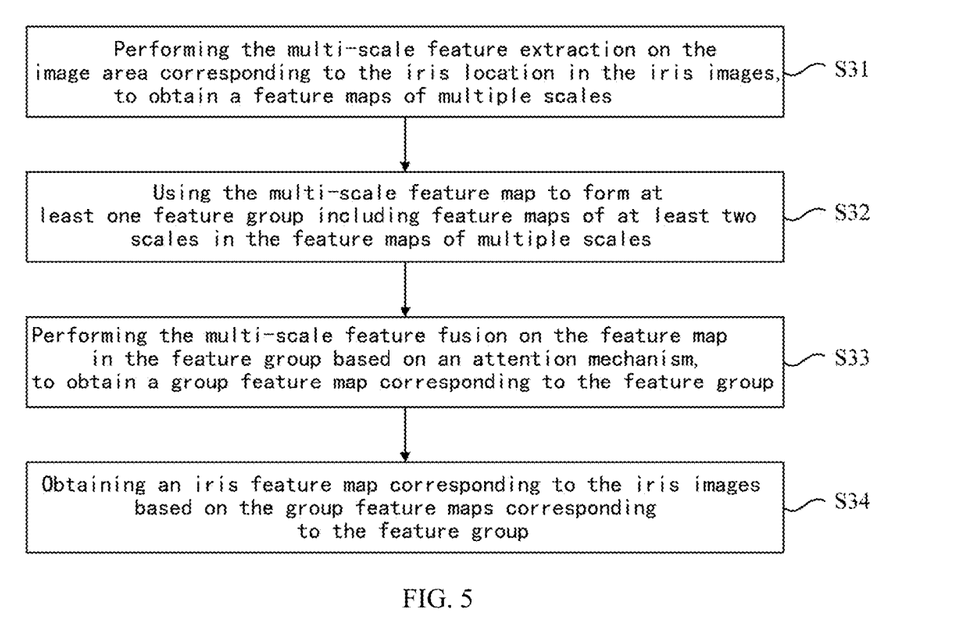
FIG. 5 shows a flow chart of step S30 in an image processing method according to an embodiment of the present disclosure.

FIG. 5 shows a flow chart of step S30 in an image processing method according to an embodiment of the present disclosure. The performing multi-scale feature extraction and multi-scale feature fusion on an image area corresponding to the iris location, to obtain an iris feature map corresponding to the iris images comprises:

S31: performing the multi-scale feature extraction on the image area corresponding to the iris location in the iris images, to obtain feature maps of multiple scales.

Figure 6:
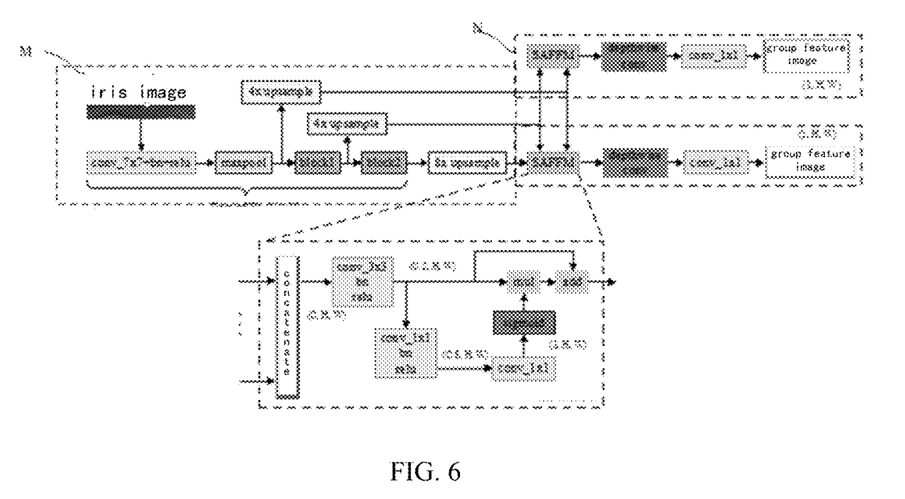
FIG. 6 shows a schematic structural diagram of a neural network implementing the image processing method according to an embodiment of the present disclosure.

In some possible embodiments, first the image area corresponding to the iris location in the iris images may be subjected to feature extraction. A feature extraction neural network may perform the feature extraction. For example, a residual network or a pyramid feature extraction network may perform the feature extraction, to obtain feature maps of multiple scales corresponding to the image area where the iris location of the iris images is located. FIG. 6 shows a schematic structural diagram of a neural network implementing the image processing method according to an embodiment of the present disclosure. The network structure M indicates the neural network part for performing feature extraction, which may be a residual network, such as ResNet18, but the present disclosure is not limited hereto.

In one example, the iris images and the iris location of the iris images may be input into the feature extraction neural network to obtain the features of the image area corresponding to the iris location of the iris images i.e. feature maps of multiple scales, by the feature extraction neural network. Or, in another example, an image area corresponding to the iris location may be taken from the iris images first; the image area may be input into the feature extraction neural network to obtain feature maps of multiple scales. The feature maps of multiple scales may be respectively output through different convolution layers of the feature extraction neural network, thereby obtaining at least two feature maps of different scales. In one example, features maps of three scales may be obtained, the three feature maps each having a different scale. Moreover, in order to obtain comprehensive feature information, the obtained feature maps of multiple scales may include low-level feature information (feature maps obtained by a front convolution layer of the network architecture) and high-level feature information (feature maps obtained by a back convolution layer of the network architecture). By fusing the above features, more accurate and comprehensive iris features can be obtained.

S32: using the feature maps of multiple scales to form at least one feature group comprising feature maps of at least two scales in the feature maps of multiple scales.

In some possible embodiments, when the feature maps of multiple scales are obtained, at least one feature group may be formed based on the feature maps of multiple scales.

The feature maps of multiple scales may serve as a feature group in subsequent feature fusion. Or, they may form at least two feature groups, each feature group including at least two feature maps of different scales. Different feature groups formed in the embodiments of the present disclosure may include the same feature map. That is, any two feature groups may include at least one different feature map. For example, the multi-scale feature maps obtained in step S31 may include F1, F2, and F3. The three feature maps each have a different scale. When forming a feature group, a first preset number of feature groups may be formed, the first preset number being an integer greater than or equal to 1. For example, the first preset number in an embodiment of the present disclosure may take a value of 2. Thence, a second preset number of feature maps may be assigned to each feature group, wherein the second preset number of feature maps may be randomly selected from the feature maps of multiple scales to form a feature group, and the selected feature map can still be selected for other feature groups. The second preset number may be an integer greater than or equal to 2. For example, the second preset number in an embodiment of the present disclosure may take a value of 2. For example, the feature maps included in a feature group are F1 and F2, and the feature maps in another feature group may be F1 and F3.

S33: performing the multi-scale feature fusion on the feature map in the feature group based on an attention mechanism, to obtain a group feature map corresponding to the feature group.

In some possible embodiments, when feature groups of feature maps of multiple scales are obtained, feature fusion may be performed on the feature maps in each feature group. During the fusion, taking into account the different degree of importance of the iris features in different positions, a spatial attention mechanism is applied, wherein a spatial attention neural network may implement the convolution based on the attention mechanism, and the obtained feature map further highlights the important features. In the training process of the spatial attention neural network, the importance of each position of the spatial features may be learned in a self-adapted manner, thereby forming an attention coefficient corresponding to the feature object in each position. The coefficient may represent a coefficient value within the interval [0, 1]. As shown in FIG. 6, the spatial attention neural network may be a network structure N.

Following the convolution by the neural network of attention mechanism, grouped convolution and standard convolution may be further performed to further obtain fused features of the respective feature maps in each feature group, i.e., group feature maps.

S34: obtaining an iris feature map corresponding to the iris images based on the group feature maps corresponding to the feature group.

In some possible embodiments, when fused features (group feature maps) of the feature maps in each feature group are obtained, the group feature maps of different feature groups may be subjected to feature fusion to obtain the iris feature map corresponding to the iris images. For example, in an embodiment of the present disclosure, the group feature maps of each feature group may be summed up to serve as the iris feature map; or, the weighted sum of each group feature map may be used as the iris feature map, wherein the weighting coefficient of the weighted summation may be set according to the requirements and the scenario, which is not limited hereto.

By the above method, different feature maps may be fused respectively, wherein the attention mechanism can further improve the attention to important features. Subsequently, based on the fusion of the group feature maps of different feature groups, the features of each part can be further fused more comprehensively.

Figure 7:
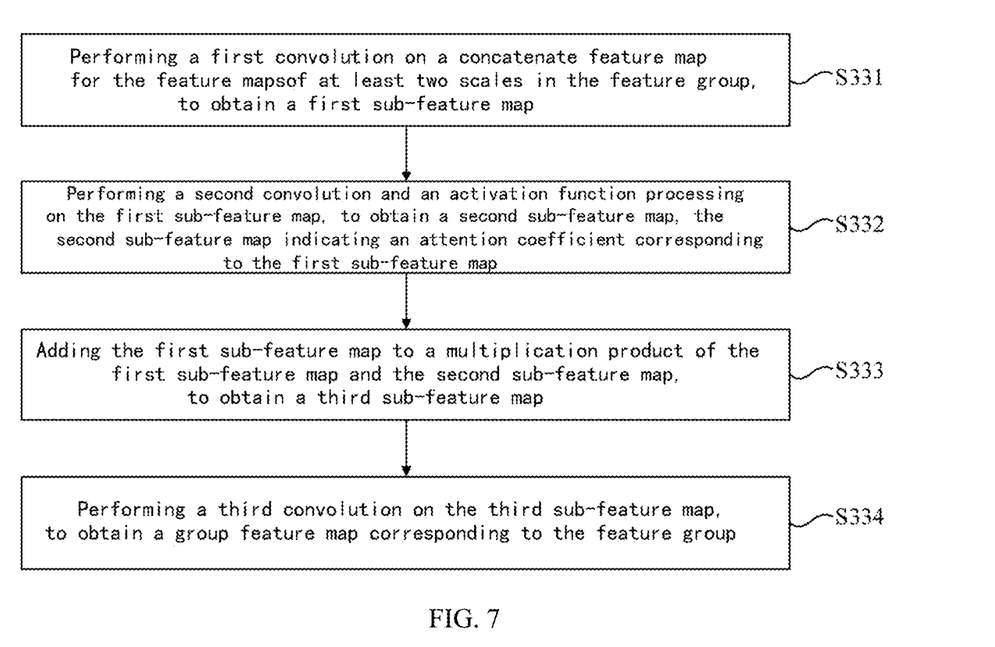
FIG. 7 shows a flow chart of step S33 in an image processing method according to an embodiment of the present disclosure.

The feature fusion process is described in detail below. FIG. 7 shows a flow chart of step S33 in an image processing method according to an embodiment of the present disclosure. The performing the multi-scale feature fusion on the feature map in the feature group based on an attention mechanism, to obtain a group feature map corresponding to the feature group comprises:

S331: performing a first convolution on a concatenate feature map of the feature maps of at least two scales in the feature group, to obtain a first sub-feature map.

In some possible embodiments, first the feature maps in each feature group may be subjected to concatenate, for example in the channel direction, to obtain the concatenate feature map, as shown in FIG. 6 where the neural network of the convolutional attention mechanism (SAFFM) is enlarged. The scale of the concatenate feature map obtained through the concatenate processing may be expressed as (C, H, W), wherein C represents the number of channels of the concatenate feature map, H represents the height of the concatenate feature map, and W represents the width of the concatenate feature map. For example, F1 and F2 in the feature map in the above feature group may be concatenated, and the feature maps F1 and F3 in another feature group may be concatenated, to obtain the corresponding concatenate feature map respectively.

When the concatenate feature maps are obtained, the concatenate feature maps may be respectively subjected to a first convolution which is performed using, for example, a 3*3 convolution kernel. Then, batch normalization and activation function may be performed to obtain a first sub-feature map corresponding to the concatenate feature map. The scale of the first sub-feature map may be expressed as (C/2, H, W). Through the first convolution, the parameters in the feature map are reduced, which reduces the subsequent calculation cost.

S332: performing a second convolution and an activation function on the first sub-feature map, to obtain a second sub-feature map, the second sub-feature map indicating an attention coefficient corresponding to the first sub-feature map.

In some possible embodiments, the obtained first sub-feature map may be subjected to a second convolution process. As shown in FIG. 6, the second convolution process may be respectively performed by two convolution layers. One of the convolution layers performs the processing using a 1*1 convolution kernel and then performs batch normalization and activation function processing to obtain a first intermediate feature map. The scale of the first intermediate feature map may be expressed as (C/8, H, W). The first intermediate feature map is then subjected to convolution with a 1*1 convolution kernel by the second convolutional layer to obtain a second intermediate feature map of (1, H, W). Through the second convolution, the first sub-feature map is reduced in dimension to obtain the second intermediate feature map of single channel.

Further, the second intermediate feature map may be subjected to activate function processing using a sigmoid function. After processing the second intermediate feature map by the sigmoid function, the second sub-feature map corresponding to the first sub-feature map is obtained. Each Element of the second sub-feature map indicates attention coefficients of the feature values of each pixel in the first sub-feature map. The coefficients may be numerical values within the range [0, 1].

S333: adding the first sub-feature map to a multiplication product of the first sub-feature map and the second sub-feature map, to obtain a third sub-feature map.

In some possible embodiments, when the second sub-feature map indicating the attention coefficients is obtained, multiplication (mul) may be performed on the first sub-feature map and the second sub-feature map, for example, by multiplying the corresponding elements. The multiplication product is added (add) to the first sub-feature map, i.e., adding the corresponding elements, to obtain a third sub-feature map. As shown in FIG. 6, the feature map output by the SAFFM is the third sub-feature map. Due to the different input feature group, the obtained third sub-feature map is also different.

S334: performing a third convolution on the third sub-feature map, to obtain a group feature map corresponding to the feature group.

When the third sub-feature map is obtained, a third convolution may be performed on the third sub-feature map. The third convolution may include at least one of group convolution and standard convolution. By the third convolution, further fusion of the feature information in each feature group is realized. As shown in FIG. 6, the third convolution may include group convolution (depth wise cony) and standard convolution with a 1*1 convolution kernel. The group convolution may speed up the convolution and improve the accuracy of the convolution features. By the third convolution, the group feature map corresponding to each feature group is output finally. The group feature map effectively fuses the features information of each feature map in the group. When the group feature map of each feature group is obtained, the weighted sum or addition of each group feature map may be used to obtain the iris feature map corresponding to the iris image.

Figure 8:
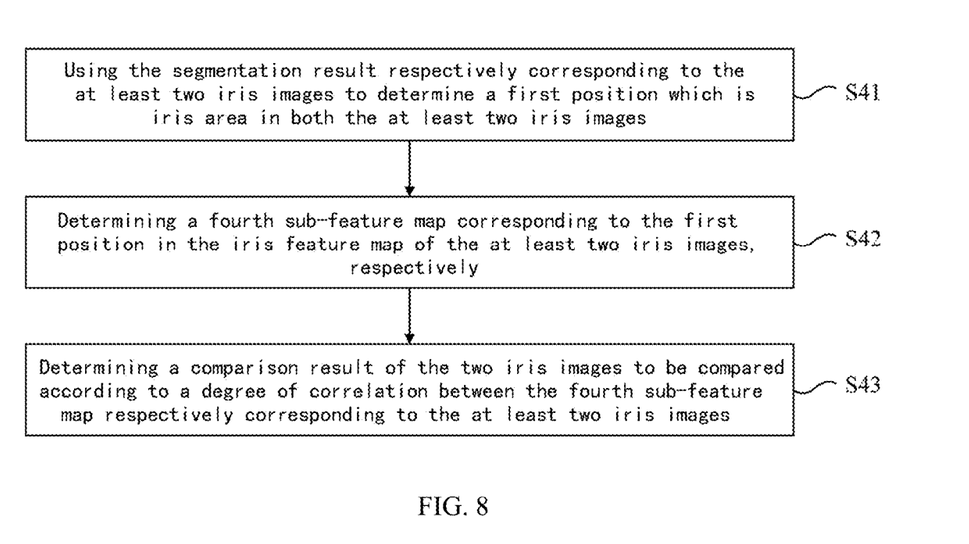
FIG. 8 shows a flow chart of step S40 in an image processing method according to an embodiment of the present disclosure.

When the iris feature map corresponding to the iris image is obtained, comparison between the iris images may be performed with further reference to the segmentation result. FIG. 8 shows a flow chart of step S40 in an image processing method according to an embodiment of the present disclosure. The using the mask map and the iris feature map corresponding to the at least two iris images in the iris image to perform comparison comprises:

S41: using the segmentation result respectively corresponding to the at least two iris images to determine a first position which is an iris area in both the at least two iris images.

In some possible embodiments, the segmentation result may be expressed as the mask map of the location of the iris area in the iris image. On this basis, according to the mask map of each iris image, the first position that is the iris area in both the iris images to be compared can be determined. As described in the foregoing embodiments, the first identification in the mask map indicates the position of the iris area. If the mask values corresponding to a pixel at the same position in the mask maps of two iris images are both the first identification, it shows that the pixel is located in the mask region in both the two iris images. Based on the position of all such pixels, the first position that is the iris area in both the two iris image can be determined.

Alternatively, in other embodiments, the first position of the iris area both in the two iris images may be determined according to the multiplication of the mask maps of the two iris images, wherein, the position of a pixel of which the multiplication of the mask maps is still the first identification is the first position that is the iris area in both iris images.

S42: determining a fourth sub-feature map corresponding to the first position in the iris feature map of the at least two iris images, respectively.

When the first position is determined, the feature corresponding to the first position in the iris feature map of each iris image can be obtained according to embodiments of the present disclosure, which is the fourth sub-feature map. In the embodiments of the present disclosure, based on the coordinates of the first position, the feature value of the corresponding pixel can be determined. A fourth sub-feature map is formed according to the determined feature value and the corresponding pixel. Alternatively, the fourth sub-feature map corresponding to the iris feature map may be obtained using the multiplication of the multiplication product of the mask map of the two iris images and each iris feature map.

Through the above configuration, the feature at the position that is iris area in both the iris feature map of the two iris images to be compared can be obtained. The comparison of the two iris images is performed according to this feature, thereby reducing the interference by features in the areas other than the iris area and improving the accuracy of the comparison.

S43: determining a comparison result of the at least two iris images according to a degree of correlation between the fourth sub-feature map respectively corresponding to the at least two iris images.

When the feature at the position that is iris area in both the iris images to be compared (the fourth sub-feature map) is obtained, the degree of correlation between the fourth sub-feature map corresponding to the two iris images to be compared can be determined. Thence, the degree of correlation can be determined as the degree of correlation between the two iris images to be compared, i.e. the comparison result. In the embodiments of the present disclosure, the degree of correlation may be Euclidean distance, or may be cosine similarity, which is not limited hereto.

In one example, in an event that the degree of correlation is Euclidean distance, the comparison between the two iris image to be compared is expressed as:

$$SD(f^1, f^2) = \frac{\sum ((f^1 - f^2)\Box(f^1 - f^2)\Box(m^1 \Box m^2))}{\sum (m^1 \Box m^2)};$$

wherein, SD ($f^1,f^2$) indicates the comparison result (degree of correlation) between the two iris image, $m^1$ and $m^2$ respectively indicate the mask map of the two iris images, $f^1$ and $f^2$ respectively indicate the iris feature map of the two iris images.

When the comparison result of the two iris image to be compared is obtained, it can be determined whether the two iris images correspond to a common human object according to the comparison result. When the degree of correlation between the fourth sub-feature map respectively corresponding to the two iris images is greater than a first threshold value, it shows that the two iris images have a relatively high degree of correlation. In that case, it can be determined that the two iris images to be compared correspond to the same object. Otherwise, when the degree of correlation between the fourth sub-feature map respectively corresponding to the two iris images to be compared is smaller than or equal to the first threshold value, it shows that the two iris images have a relatively low degree of correlation. In that case, it can be determined that the two iris images to be compared correspond to different objects. The first threshold value may be a preset value, for example, may be 70%, which is not limited hereto.

As described in the foregoing embodiments, the image processing method provided by the embodiments of the present disclosure can be implemented by a neural network, for example, by the network structure shown in FIG. 6. The process of training the neural network will be described below.

First of all, a training image group is obtained. The training image may include iris images of at least two human objects. There is at least one iris image for each human object. The iris images may vary in resolution, image quality and size, so as to improve the applicability of the neural network.

Then, the neural network performs image processing of the training image to obtain the group feature map corresponding to each feature group obtained by the image processing of each training image. Thence, based on the obtained group feature map, the network loss of the neural network is obtained. In a case where the network loss is less than the loss threshold, it means that the neural network meets the requirements for the detection accuracy and is applicable. In a case where the network loss is greater than or equal to the loss threshold, the parameters, such as convolution parameters, of the neural network may be fed back and adjusted till the obtained loss function is less than the loss threshold. The loss threshold may be a value set as needed, such as 0.1, which is not limited hereto.

In addition, according to the embodiments of the present disclosure, in order to improve the detection accuracy of the network, the network loss may be determined according to the minimum degree of correlation between the iris feature maps of the same human object and the maximum degree of correlation between different human objects. For example, the loss function can be expressed as:

$$L_s = \sum_{i=1}^{P} \sum_{a=1}^{K} \left[ m + \max_{p=1\ldots K} MMSD(f_{ia}^s, f_{ip}^s) \right] - \min_{\substack{j=1\ldots P, \\ n=1\ldots K, \\ j\neq i}} MMSD(f_{ia}^s, f_{jn}^s)];$$

$$MMSD(f^{1,s}, f^{2,s}) = \min_{-B \leq b \leq B} SD(f_b^{1,s}, f^{2,s});$$

$$L_{total} = \lambda_1 L_1 + \lambda_1 L_2.$$

Wherein, Ls indicates the network loss corresponding to the group feature map obtained from a common feature fusion branch, P indicates the total number of human objects, K indicates the total number of iris images of each human object, s indicates the group number of feature groups, m indicates a common iris area, B indicates the column number of the group feature map, $f_{ia}^s$ indicates a feature of an a-th iris image of an i-th human object in an s-th group, $f_{jn}^s$ indicates a feature of an n-th iris image of a j-th human object in the s-th group, MMSD function indicates the degree of correlation between features, for example, MMSD($f^{1,s}$, $f^{2,s}$) indicates a minimum value of the degree of correlation between a feature map $f_b^{1,s}$ obtained by column transposing the group feature map i of one of the training images and the group feature map $f^{2,s}$ of the second training image, $L_{total}$ indicates the weighted sum of the network loss corresponding to the group feature map obtained for different feature fusion branch, i.e., the network loss of the entire neural network, $\lambda_1$ and $\lambda_1$ each indicate a weighting coefficient, $L_1$ and $L_2$ each indicates the network loss corresponding to the two groups.

In the embodiments of the present disclosure, by performing preprocessing on the iris images, the iris area in the iris images is located and segmented to obtain the iris location and the segmentation result corresponding to the iris area. Meanwhile, multi-scale feature extraction and multi-scale feature fusion can be performed on the iris images to obtain high-precision iris feature maps. Then, the segmentation results and the iris feature maps are used to perform identity recognition on the iris images to determine whether the iris images correspond to the same object. Through the above configuration, it is possible to sufficiently fuse the extracted low-level features and high-level features by means of multi-scale feature extraction and multi-scale feature fusion, so that the finally obtained iris features take into account both the texture features at a low level and the classification features at a high level, thereby improving the accuracy of feature extraction. In addition, it is also possible to only consider the feature part of the iris area and reduce the influence of the other areas by combining the segmentation results with iris feature maps—thereby more accurately identifying whether the iris images correspond to the same object and obtaining more accurate detection result. Furthermore, according to the characteristics of the varying importance of the texture region of the iris images, a spatial attention mechanism is used in the neural network in the embodiments of the present application to allow the network to learn the iris features in a self-adapted manner.

A person skilled in the art can understand that the writing order of each step in the above methods of the specific embodiments does not mean a strict execution order and constitutes no limitation on the implementation process. The specific order of execution of the steps should be determined by the functions and possible inherent logics of the steps.

It is appreciated that the afore-mentioned method embodiments of the present disclosure may be combined with one another to form a combined embodiment without departing from the principle and the logics, which, due to limited space, will not be repeatedly described in the present disclosure.

In addition, the present disclosure further provides an image processing device, an electronic apparatus, a computer readable medium and a program which are all capable of realizing any image processing method provided by the present disclosure. The corresponding technical solution and description will not be repeated; reference may be made to the corresponding description of the method.

Figure 9:
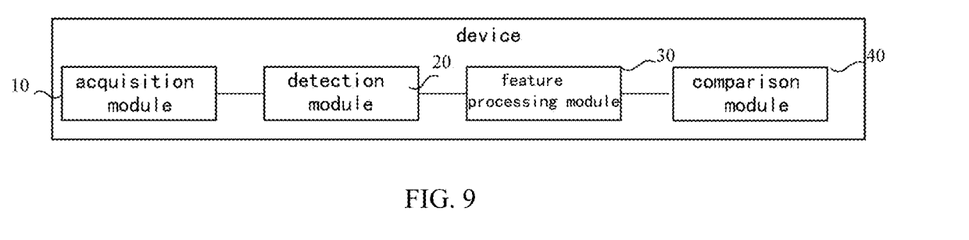
FIG. 9 shows a block diagram of an image processing device according to an embodiment of the present disclosure.

FIG. 9 shows a block diagram of an image processing device according to an embodiment of the present disclosure. As shown in FIG. 9, the image processing device comprises:

an acquisition module 10 configured to acquire an iris image group comprising at least two iris images to be compared;

a detection module 20 configured to detect an iris location in the iris images and a segmentation result of iris area in the iris images;

a feature processing module 30 configured to perform multi-scale feature extraction and multi-scale feature fusion on the image area corresponding to the iris location, to obtain an iris feature map corresponding to the iris images; and a comparison module 40 configured to perform comparison using the segmentation result and the iris feature map respectively corresponding to the at least two iris images, and determine whether the two iris images to be compared correspond to the same object based on a comparison result of the comparison.

In some possible embodiments, the feature processing module is configured further to: perform the multi-scale feature extraction on the image area corresponding to the iris location in the iris images, to obtain feature maps of multiple scales;

use the feature maps of multiple scales to form at least one feature group comprising feature maps of at least two scales in the feature maps of multiple scales;

perform the multi-scale feature fusion on the a feature map in the feature group based on attention mechanism, to obtain group feature maps corresponding to the feature group; and obtain an iris feature map corresponding to the iris images based on the group feature maps corresponding to the feature group.

In some possible embodiments, the feature processing module is further configured to: perform a first convolution on a concatenate feature map for the feature maps of at least two scales in the feature group, to obtain a first sub-feature map;

performing a second convolution and an activation function processing on the first sub-feature map, to obtain a second sub-feature map, the second sub-feature map indicating an attention coefficient corresponding to the first sub-feature map;

adding the first sub-feature map to a multiplication product of the first sub-feature map and the second sub-feature map, to obtain a third sub-feature map; and performing a third convolution on the third sub-feature map, to obtain the group feature map corresponding to the feature group.

In some possible embodiments, the feature processing module is configured further to perform weighted summation on the group feature maps corresponding to each feature group, to obtain an iris feature map corresponding to the iris images.

In some possible embodiments, the segmentation result includes a mask map corresponding to an iris area in the iris images, a first identification in the mask map indicates the iris area, and a second identification in the mask map indicates a position area other than the iris area.

In some possible embodiments, the detection module is configured further to: perform target detection on the iris images, to determine the iris location and the pupil location in the iris images; and perform the segmentation on the iris images based on the determined iris locations and pupil locations, to obtain the segmentation results of iris areas in the iris images.

In some possible embodiments, the detection module is configured further to perform normalization on the image area corresponding to the iris location and the segmentation result, respectively;

the feature processing module is configured further to:

perform the multi-scale feature extraction and the multi-scale feature fusion on the image area corresponding to the iris location and subjected to normalization, to obtain an iris feature map corresponding to the iris images.

In some possible embodiments, the comparison module is configured further to: use the segmentation result respectively corresponding to the at least two iris images to determine a first position which is in the iris area in both the at least two iris images;

determine fourth sub-feature maps corresponding to the first position in the iris feature map of the at least two iris images, respectively; and determine a comparison result of the at least two iris images according to a degree of correlation between the fourth sub-feature map respectively corresponding to the at least two iris images.

In some possible embodiments, the comparison module is configured further to determine, in an event that the degree of correlation between the fourth sub-feature map respectively corresponding to the at least two iris images is greater than a first threshold value, that the at least two iris images correspond to the same object.

In some possible embodiments, the comparison module is configured further to determine, in an event that the degree of correlation between the fourth sub-feature map respectively corresponding to the at least two iris images is less than or equal to a first threshold value, that the at least two iris images correspond to different objects.

In some possible embodiments, the device comprises a neural network, the neural network comprising the acquisition module, the detection module, the feature processing module and the comparison module.

In some embodiments, the functions or modules included in the device provided in the embodiments of the present disclosure may be configured to execute the methods described in the above embodiments. The specific implementation may refer to the description of the embodiments of the method and will not be described repetitively to be concise.

The embodiments of the present disclosure also propose a computer-readable storage medium which stores computer program instructions, the computer program instructions implementing the afore-described method when executed by a processor. The computer-readable storage medium may be a non-volatile computer-readable storage medium.

The embodiments of the present disclosure also propose an electronic apparatus, comprising: a processor; a memory for storing processor executable instructions, wherein the processor is configured to execute the above method.

The electronic apparatus may be provided as a terminal, a server or an apparatus in other form.

Figure 10:
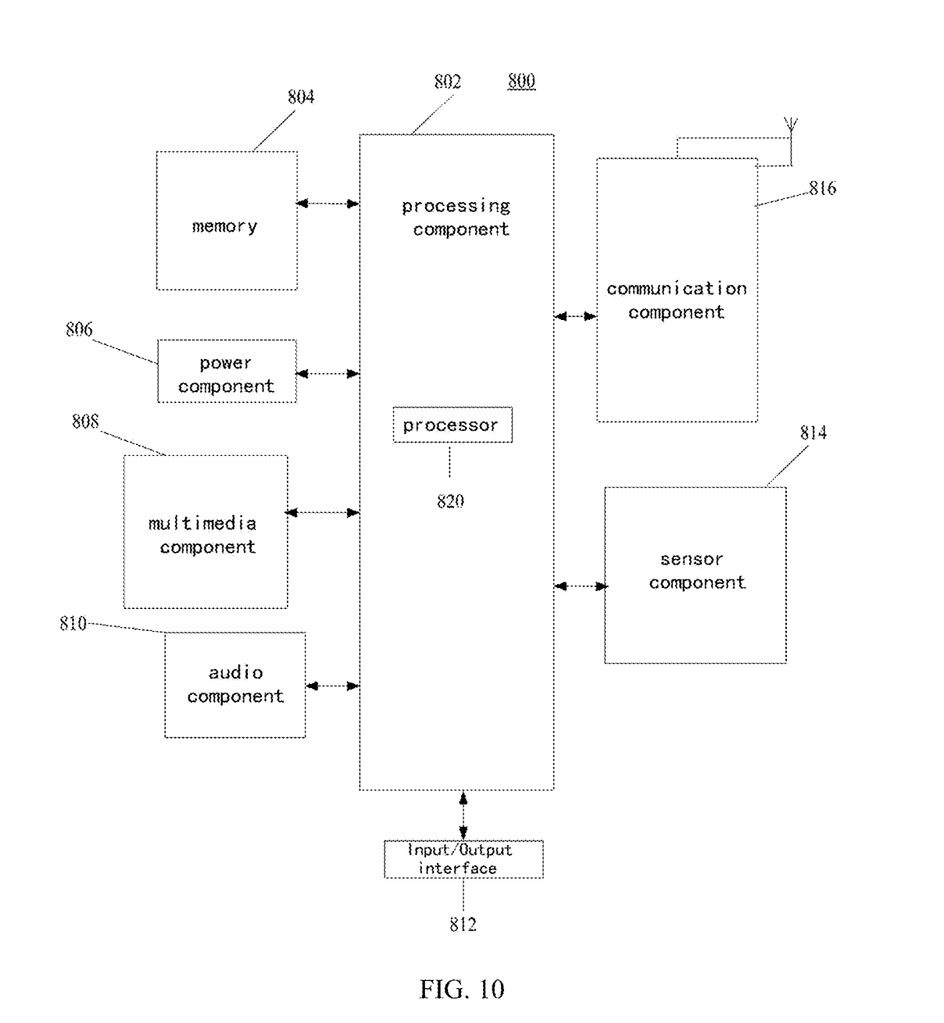
FIG. 10 shows a block diagram of an electronic apparatus according to an embodiment of the present disclosure.

FIG. 10 shows a block diagram showing an electronic apparatus according to an embodiment of the present disclosure. For example, electronic apparatus 800 may be a mobile phone, a computer, a digital broadcasting terminal, a message receiving and sending apparatus, a game console, a tablet apparatus, medical equipment, fitness equipment, a personal digital assistant, and the like.

Referring to FIG. 10, electronic apparatus 800 includes one or more of the following components: a processing component 802, a memory 804, a power component 806, a multimedia component 808, an audio component 810, an input/output (I/O) interface 812, a sensor component 814, and a communication component 816.

Processing component 802 is generally configured to control overall operations of electronic apparatus 800, such as the operations associated with display, telephone calls, data communications, camera operations, and recording operations. Processing component 802 can include one or more processors 820 to execute instructions to complete all or part of the steps included in the above-described methods. In addition, processing component 802 may include one or more modules to facilitate the interaction between the processing component 802 and other components. For example, processing component 802 may include a multimedia module to facilitate the interaction between multimedia component 808 and processing component 802.

Memory 804 is configured to store various types of data to support the operation of electronic apparatus 800. Examples of such data include instructions for any applications or methods operated on electronic apparatus 800, contact data, phonebook data, messages, pictures, video, etc. Memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Power component 806 is configured to provide power to various components of electronic apparatus 800. Power component 806 may include a power management system, one or more power sources, and any other components associated with the generation, management, and distribution of power for electronic apparatus 800.

Multimedia component 808 includes a screen providing an output interface between electronic apparatus 800 and a user. In some embodiments, the screen may include a liquid crystal display (LCD) and a touch panel (TP). If the screen includes the touch panel, the screen may be implemented as a touch screen to receive input signals from the user. The touch panel may include one or more touch sensors configured to sense touches, swipes, and gestures on the touch panel. The touch sensors may sense not only a boundary of a touch or swipe action, but also a period of time and a pressure associated with the touch or swipe action. In some embodiments, multimedia component 808 may include a front camera and/or a rear camera. The front camera and/or the rear camera may receive an external multimedia datum while electronic apparatus 800 is in an operation mode, such as a photographing mode or a video mode. Each of the front camera and the rear camera may be a fixed optical lens system or may have focus and optical zoom capabilities.

Audio component 810 is configured to output and/or input audio signals. For example, audio component 810 may include a microphone (MIC) configured to receive an external audio signal when electronic apparatus 800 is in an operation mode, such as a call mode, a recording mode, and a voice recognition mode. The received audio signal may be further stored in memory 804 or transmitted via communication component 816. In some embodiments, audio component 810 further includes a speaker configured to output audio signals.

I/O interface 812 is configured to provide an interface between processing component 802 and peripheral interface modules, such as a keyboard, a click wheel, buttons, and the like. The buttons may include, but are not limited to, a home button, a volume button, a starting button, and a locking button.

Sensor component 814 may include one or more sensors configured to provide status assessments of various aspects of electronic apparatus 800. For example, sensor component 814 may detect an open/closed status of electronic apparatus 800, relative positioning of components, e.g., the display and the keypad of electronic apparatus 800, a change in position of electronic apparatus 800 or a component of electronic apparatus 800, a presence or absence of user contact with electronic apparatus 800, an orientation or an acceleration/deceleration of electronic apparatus 800, and a change in temperature of electronic apparatus 800. Sensor component 814 may include a proximity sensor configured to detect the presence of nearby objects without any physical contact. Sensor component 814 may also include a light sensor, such as a CMOS or CCD image sensor, for use in imaging applications. In some embodiments, sensor component 814 may also include an accelerometer sensor, a gyroscope sensor, a magnetic sensor, a pressure sensor, or a temperature sensor.

Communication component 816 is configured to facilitate wired or wireless communication between electronic apparatus 800 and other apparatuses. Electronic apparatus 800 can access a wireless network based on a communication standard, such as WiFi, 2G, or 3G, 4G, or a combination thereof. In an exemplary embodiment, communication component 816 receives a broadcast signal from an external broadcast management system or broadcast associated information via a broadcast channel. In an exemplary embodiment, communication component 816 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or any other suitable technologies.

In exemplary embodiments, the electronic apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage mediums, such as memory 804 including computer program instructions executable by processor 820 of electronic apparatus 800, to complete the above-described methods.

The embodiments of the present disclosure also provide a computer program product, comprising computer readable codes, wherein when the computer readable codes run on the device, the processor in the apparatus executes instructions for implementing the method provided in any of the above embodiments.

The computer program product may be specifically implemented by hardware, software, or a combination thereof. In an optional embodiment, the computer program product is specifically implemented as a computer storage medium. In another optional embodiment, the computer program product is specifically implemented as a software product, such as a Software Development Kit (SDK), etc.

Figure 11:
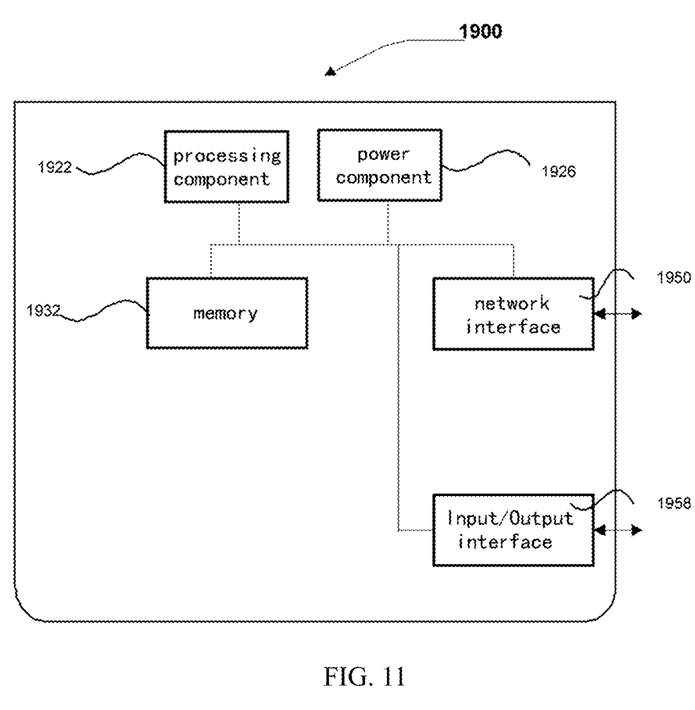
FIG. 11 shows a block diagram of another electronic apparatus according to an embodiment of the present disclosure.

FIG. 11 shows a block diagram of another electronic apparatus according to an embodiment of the present disclosure. For example, the apparatus 1900 may be provided as a server. Referring to FIG. 11, the apparatus 1900 includes a processing component 1922, which further includes one or more processors, and a memory resource represented by a memory 1932 configured to store instructions such as application programs executable for the processing component 1922. The application programs stored in the memory 1932 may include one or more module, each of which corresponds to a set of instructions. In addition, the processing component 1922 is configured to execute the instructions to execute the abovementioned methods.

The apparatus 1900 may further include a power component 1926 configured to execute power management of the apparatus 1900, a wired or wireless network interface 1950 configured to connect the apparatus 1900 to a network, and an Input/Output (I/O) interface 1958. The apparatus 1900 may be operated on the basis of an operating system stored in the memory 1932, such as Window server, Mac OS X™, Unix™, Linux or Free BSD™, and the like.

In exemplary embodiments, there is also provided a non-transitory computer readable storage medium, such as memory 1932 including computer program instructions, which are executable by processing component 1922 of apparatus 1900 to perform the above-described methods.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider),In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. An image processing method,
wherein the image processing method is implemented by a convolution neural network, and wherein the image processing method comprises:
acquiring an iris image group including at least two iris images to be compared;
detecting an iris location in the iris images and a segmentation result of iris area in the iris images;
performing multi-scale feature extraction and multi-scale feature fusion on an image area corresponding to the iris location, to obtain an iris feature map corresponding to the iris images; and
performing comparison using the segmentation result and the iris feature map respectively corresponding to the at least two iris images, and determining whether or not the at least two iris images correspond to the same object based on a comparison result of the comparison.

2. The method according to claim 1, wherein performing the multi-scale feature extraction and the multi-scale feature fusion on the image area corresponding to the iris location, to obtain the iris feature map corresponding to the iris images comprises:
performing the multi-scale feature extraction on the image area corresponding to the iris location in the iris images, to obtain feature maps of multiple scales;
using the feature maps of multiple scales to form at least one feature group including feature maps of at least two scales in the feature maps of multiple scales;
performing the multi-scale feature fusion on the feature map in the feature group based on an attention mechanism, to obtain a group feature map corresponding to the feature group; and
obtaining the iris feature map corresponding to the iris images based on the group feature map corresponding to the feature group.

3. The method according to claim 2, wherein performing the multi-scale feature fusion on the feature map in the feature group based on the attention mechanism, to obtain the group feature map corresponding to the feature group comprises:
performing a first convolution on a concatenate feature map for the feature maps of at least two scales in the feature group, to obtain a first sub-feature map;
performing a second convolution and an activation function processing on the first sub- feature map, to obtain a second sub-feature map, the second sub-feature map indicating an attention coefficient corresponding to the first sub-feature map;
adding the first sub-feature map to a multiplication product of the first sub-feature map and the second sub-feature map, to obtain a third sub-feature map; and
performing a third convolution on the third sub-feature map, to obtain the group feature map corresponding to the feature group.

4. The method according to claim 3, wherein the segmentation result includes a mask map corresponding to the iris area in the iris images, a first identification in the mask map indicates the iris area, and a second identification in the mask map indicates a position area other than the iris area.

5. The method according to claim 3, wherein detecting the iris location in the iris images and the segmentation result of the iris area in the iris images further comprises:
performing normalization on image area corresponding to the iris location in the iris images and the segmentation result respectively;
wherein performing the multi-scale feature extraction and the multi-scale feature fusion on the image area corresponding to the iris location, to obtain the iris feature map corresponding to the iris images further comprises:
performing the multi-scale feature extraction and the multi-scale feature fusion on the image area corresponding to the iris location and subjected to normalization, to obtain the iris feature map corresponding to the iris images.

6. The method according to claim 2, wherein obtaining the iris feature map corresponding to the iris images based on the group feature map corresponding to the feature group comprises:
performing weighted summation on the group feature map corresponding to each feature group, to obtain the iris feature map corresponding to the iris images.

7. The method according to claim 1, wherein detecting the iris location in the iris images and the segmentation result of the iris area in the iris images comprises:
performing target detection on the iris images, to determine the iris location and a pupil location in the iris images; and
performing the segmentation on the iris images based on the determined iris location and pupil location, to obtain the segmentation result of the iris area in the iris images.

8. The method according to claim 1 wherein performing the comparison using the segmentation result and the iris feature map respectively corresponding to the at least two iris images comprises:
using the segmentation result respectively corresponding to the at least two iris images to determine a first position that is iris area in both the at least two iris images;
determining a fourth sub-feature map corresponding to the first position in the iris feature map of the at least two iris images, respectively; and
performing comparison of the at least two iris images according to a degree of correlation between the fourth sub-feature map respectively corresponding to the at least two iris images.

9. The method according to claim 8, wherein determining whether or not the at least two iris images correspond to the same object based on the comparison result of the comparison comprises:
determining that the at least two iris images correspond to the same object if the degree of correlation between the fourth sub-feature map respectively corresponding to the at least two iris images is greater than a first threshold value.

10. The method according to claim 8, wherein determining whether the at least two iris images correspond to the same object based on the comparison result of the comparison further comprises:
determining that the at least two iris images correspond to different objects if the degree of correlation between the fourth sub-feature map respectively corresponding to the at least two iris images is less than or equal to a first threshold value.

11. An image processing device, comprising:
a processor; and
a memory configured to store processor-executable instructions, wherein the processor is configured to invoke the instructions stored in the memory to perform operations, wherein the operations are implemented by a convolution neural network, and wherein the operations comprise:
acquiring an iris image group including at least two iris images to be compared;
detecting an iris location in the iris images and a segmentation result of iris area in the iris images;
performing multi-scale feature extraction and multi-scale feature fusion on an image area corresponding to the iris location, to obtain an iris feature map corresponding to the iris images; and
performing comparison using the segmentation result and the iris feature map respectively corresponding to the at least two iris images, and determining whether or not the at least two iris images correspond to the same object based on a comparison result of the comparison.

12. The device according to claim 11, wherein performing the multi-scale feature extraction and the multi-scale feature fusion on the image area corresponding to the iris location, to obtain the iris feature map corresponding to the iris images further comprises:
performing the multi-scale feature extraction on the image area corresponding to the iris location in the iris images, to obtain feature maps of multiple scales;
using the feature maps of multiple scales to form at least one feature group including feature maps of at least two scales in the feature maps of multiple scales;
performing the multi-scale feature fusion on a feature map in the feature group based on an attention mechanism, to obtain group feature maps corresponding to the feature group; and
obtaining the iris feature map corresponding to the iris images based on the group feature map corresponding to the feature group.

13. The device according to claim 12, wherein performing the multi-scale feature extraction and the multi-scale feature fusion on the image area corresponding to the iris location, to obtain the iris feature map corresponding to the iris images further comprises:
performing a first convolution on a concatenate feature map for the feature maps of at least two scales in the feature group, to obtain a first sub-feature map;
performing a second convolution and an activation function processing on the first sub-feature map, to obtain a second sub-feature map, the second sub-feature map indicating an attention coefficient corresponding to the first sub-feature map;
adding the first sub-feature map to a multiplication product of the first sub-feature map and the second sub-feature map, to obtain a third sub-feature map; and
performing a third convolution on the third sub-feature map, to obtain the group feature map corresponding to the feature group.

14. The device according to claim 13, wherein the segmentation result includes a mask map corresponding to the iris area in the iris images, a first identification in the mask map indicates the iris area, and a second identification in the mask map indicates a position area other than the iris area.

15. The device according to claim 13, wherein detecting the iris location in the iris images and the segmentation result of iris area in the iris images further comprises performing normalization on the image area corresponding to the iris location in the iris images and the segmentation result respectively;
performing the multi-scale feature extraction and the multi-scale feature fusion on the image area corresponding to the iris location, to obtain the iris feature map corresponding to the iris images further comprises performing the multi-scale feature extraction and the multi-scale feature fusion on the image area corresponding to the iris location and subjected to normalization, to obtain the iris feature map corresponding to the iris images.

16. The device according to claim 12, wherein performing the multi-scale feature extraction and the multi-scale feature fusion on the image area corresponding to the iris location, to obtain the iris feature map corresponding to the iris images further comprises performing weighted summation on the group feature map corresponding to each feature group, to obtain the iris feature map corresponding to the iris images.

17. The device according to claim 11, wherein detecting the iris location in the iris images and the segmentation result of iris area in the iris images further comprises:
performing target detection on the iris images, to determine the iris location and a pupil location in the iris images; and
performing the segmentation on the iris images based on the determined iris location and pupil location, to obtain the segmentation result of iris area in the iris images.

18. The device according to claim 11, wherein performing comparison using the segmentation result and the iris feature map respectively corresponding to the at least two iris images, and determining whether or not the at least two iris images correspond to the same object based on a comparison result of the comparison further comprises:
using the segmentation result respectively corresponding to the at least two iris images to determine a first position that is iris area in both the at least two iris images;
determining fourth sub-feature maps corresponding to the first position in the iris feature map of the at least two iris images, respectively; and
determining the comparison result of the at least two iris images according to a degree of correlation between the fourth sub-feature map respectively corresponding to the at least two iris images.

19. A non-transitory computer readable storage medium having computer program instructions stored thereon, wherein when the computer program instructions are executed by a processor, the processor is caused to perform operations, wherein the operations are implemented by a convolution neural network, and wherein the operations comprise:
acquiring an iris image group including at least two iris images to be compared;
detecting an iris location in the iris images and a segmentation result of iris area in the iris images;
performing multi-scale feature extraction and multi-scale feature fusion on an image area corresponding to the iris location, to obtain an iris feature map corresponding to the iris images; and
performing comparison using the segmentation result and the iris feature map respectively corresponding to the at least two iris images, and determining whether or not the at least two iris images correspond to the same object based on a comparison result of the comparison.

* * * * *